United States Patent
Sick et al.

(10) Patent No.: US 7,813,976 B2
(45) Date of Patent: Oct. 12, 2010

(54) COMPUTER-BASED SYSTEM AND METHOD FOR SEARCHING AND SCREENING FINANCIAL SECURITIES AND RELEVANT INTELLECTUAL PROPERTY

(76) Inventors: Terrence Sick, 1025 Exchange St., Rochester, NY (US) 14608; Eric Schneider, 13944 Cedar Rd., #258, University Heights, OH (US) 44118; Michael L. Weiner, 693 Summit Dr., Webster, NY (US) 14580

( * ) Notice: Subject to any disclaimer, the term of this patent is extended or adjusted under 35 U.S.C. 154(b) by 3213 days.

(21) Appl. No.: 09/965,071

(22) Filed: Sep. 27, 2001

(65) Prior Publication Data

US 2002/0040338 A1   Apr. 4, 2002

Related U.S. Application Data

(60) Provisional application No. 60/236,974, filed on Sep. 30, 2000.

(51) Int. Cl.
*G06Q 40/00* (2006.01)

(52) U.S. Cl. .......................................... 705/35; 705/37

(58) Field of Classification Search ................... 705/35
See application file for complete search history.

(56) References Cited

U.S. PATENT DOCUMENTS

| | | | |
|---|---|---|---|
| 5,991,751 A | | 11/1999 | Rivette et al. |
| 6,012,042 A | * | 1/2000 | Black et al. ................ 705/36 R |
| 6,061,681 A | * | 5/2000 | Collins .......................... 707/5 |
| 6,983,320 B1 | * | 1/2006 | Thomas et al. .............. 709/224 |

FOREIGN PATENT DOCUMENTS

WO   WO 00/33212   6/2000

OTHER PUBLICATIONS

Patent assignee dialog—Google News Archive Search (1980-2000). (5 pages).*
Patent assignee lexisnexis—Google News Archive Search (1980-2000). (1 page).*
Patent assignee stn—Google News Archive Search (1980-2000). (2 pages).*
Ticker dialog business or finance or economic—Google News Archive Search (1980-2000). (23 pages).*
Ticker lexisnexis business or finance or economic—Google News Archive Search (1980-2000). (13 pages).*

(Continued)

*Primary Examiner*—Jagdish N Patel
*Assistant Examiner*—Sara Chandler
(74) *Attorney, Agent, or Firm*—Duane C. Basch; Basch & Nickerson LLP (57) ABSTRACT

In an on-line financial screening service, a database of financial and intellectual property information is searched to find at least one financial security matching user defined financial search criteria. Selection preferences for a financial security are defined as search criteria. The financial search criteria includes but is not limited to the following: Stock Price, Price/Earnings Ratio, Current Ratio, Debt/Equity Ratio, Cash/Price ratio, Earnings per Share Growth-1 Yr, Earnings per Share Growth-5 Yr, Insider Trades, Institutional Holdings %, Price/Book Ratio, Price/Cash Flow Ratio. The databases are repeatedly searched for records matching the financial selection criteria preferences of the user. Financial securities meeting the users search criteria are then matched to an intellectual property database to determine the number of patents a financial security has been issued.

12 Claims, 11 Drawing Sheets

OTHER PUBLICATIONS

Patent ticker dialog business or finance- Google News Archive Search (1980-2000). (2 pages).*
Patent ticker dialog business or finance- Google News Archive Search (1980-2000). (1 page).*
Patent ticker lexisnexis business or finance- Google News Archive Search (1980-2000). (1 page).*
Business Wire, first Call to Offer Zimalist Smith's publications as part of expanding subscription services program, Dec. 16, 1996, entire article.
Barker et al the Web User's Guide to Screening Stocks, Business Week, Sep. 22, 1997, No. 3545, p. 114.

* cited by examiner

| TICKER | ASSIGNEE CODE | COUNT | PATENT NUMBER | URL |
|---|---|---|---|---|
| TLDA | TLDA CORP | 4 | 5987464 | http://tlda.com |
| GE | GENERAL ELECTRIC | 15000 | 5555678 | http://ge.com |
| F | FORD | 5000 | 6007002 | http://ford.com |

COMPUTER-BASED SYSTEM AND METHOD FOR SEARCHING AND SCREENING FINANCIAL SECURITIES AND RELEVANT INTELLECTUAL PROPERTY

CROSS REFERENCE TO RELATED APPLICATION

The following related application is hereby incorporated by reference for its teachings:

"COMPUTER-BASED SYSTEM AND METHOD FOR SEARCHING AND SCREENING FINANCIAL SECURITIES AND RELEVANT INTELLECTUAL PROPERTY," T. Sick et al., application Ser. No. 60/236,974, filed Sep. 30, 2000.

FIELD OF THE INVENTION

This invention relates to a computer-implemented financial securities service, and more particularly, to a method, system and apparatus for real-time, on-line computer searching and matching of database entries based on intellectual property and other user-selectable search criteria.

BACKGROUND OF THE INVENTION

Patents are becoming more and more important to a business's success, especially in today's global economy. Patents can be viewed as a new type of currency in this global economy because they grant the holder a right to exclude others from making, using, or selling the patented technology. Patents are further valuable because they collectively represent a vast technological database. Much of this database is only available as issued patents (e.g., it is not released in any other form). According to Larry Kahaner's book, Competitive Intelligence, Simon & Schuster, 1996, "More than 75 percent of the information contained in U.S. patents is never released anywhere else." Of course, not all patents are as valuable to the patent owner or patent licensees as others. Some owned or licensed patents provide little or no value to the corporate entity. These patents become a drain on corporate resources, for example, in obtaining the patents, paying maintenance fees, and paying license fees.

A number of patent searching tools are available, such as the United States Patent and Trademark Office (USPTO) Automated Patent System (APS), and the on-line search services offered by Lexis and Westlaw. Other providers of patent information and patent search tools include Derwent, Micro-Patent, Questel, Corporate Intelligence, STN, IFI/Plenum, The Shadow Patent Office (EDS), IBM, and CAS. These tools are not analysis tools, but rather search tools. These tools enable a user to identify patents that satisfy a specified keyword or other search criterion. However, these tools have limited, if any, automated functions to aid a user in analyzing the patents for the purpose of making tactical and strategic business decisions based on the patents, whether the company's own patents or those of competitors.

U.S. Pat. No. 5,991,751 issued on Nov. 23, 1999 by Rivette, et al., entitled, "System, method, and computer program product for patent-centric and group-oriented data processing" discloses a system for evaluating the value of the corporation's patent portfolio. To fully analyze the value and applicability of the corporation's patent portfolio, the user must take into account other information, such as R&D information, financial information, manufacturing information, and licensing information, for both the corporation and its competitors. The '751 patent is an example of a prior art system that processes patent information as an analysis tool. Such analysis is used to better manage patent portfolios by referencing non-patent information to make a decision. However, the '751 patent does not consider the portfolio management of non-patent information by referencing patent information to make a decision.

The sheer number of patents and the number of companies applying for them make it difficult to filter out which companies may hold a competitive advantage in their respective markets. Financial fundamentals alone do not allow a user to determine if a particular company is poised for long term growth. In today's fast paced world of market penetration and dominance, intellectual property is playing a more important role in the survival of any company. Patents can add a 50% premium to a company's valuation, especially when the patents a company holds are first announced. There are systems that take advantage of Internet technology to aid in this process. In these systems, a person wishing to screen financial securities and relevant intellectual property information first requires a user to find an online financial stock screening tool, define filtering criteria and wait for the result set to be returned to the user. As a second step, if a user wishes to now evaluate the patents that these companies may possess, a second search is required by accessing a web site to search patents. This is a very cumbersome process.

In most of these prior systems, the user is able to select a category of stocks based on financial selection preferences. That is, a stock that is currently trading between $2 and $10 with a price to earnings ratio less than 10, whereas a user seeking to find patents on a particular company would first go to a patent information website, define search criteria and then get a result set of patents of all companies based on the users search criteria. The user would then select the companies of interest and go to a financial website and select a screening tool.

In general, these prior art systems remain as stand alone non-integrated systems. Accordingly, it is desirable to provide a system which helps investors screen out investment opportunities by combining fundamental financial search criteria with that of patent search criteria such as intellectual property holdings, patents issued and the like.

SUMMARY OF THE INVENTION

It is desirable to provide an integrated on-line financial securities service and intellectual property screening tool that provides user-controlled perusal of search results. It is further desirable to provide an on-line financial securities service that always provides users with the ability to perform searches based on user-specified criteria, including patent criteria. It is still further desirable to provide an on-line financial securities service that provides at least one search result, regardless of what search criteria is specified.

The invention integrates both financial search criteria and intellectual property search criteria into a single user interface. The present invention filters the search results of public companies having patent portfolios. The invention filters the search results of patents assigned to only public companies. The present invention filters search results of network resources that correspond only to patent information. The invention automatically broadens a search request until a search result is found in response to determining that a previous search request does not have a search result.

In general, in accordance with the present invention there is provided, in an on-line financial screening service, a method for searching a financial database and an intellectual property database in order to find securities matching search criteria and relevant intellectual property. The method includes the steps of searching the databases for records matching search criteria defined by a user, relaxing at least some of the search criteria, until at least a required number of matching records are found wherein the required number of matching records is never less than one, and reporting the matching records to the user.

In accordance with additional aspects of the present invention, there is provided in an on-line service, a method for screening financial investment opportunities, comprising the steps of: searching a financial database for data records associated with at least one company based upon a financial search criteria and retrieving the results thereof; searching an intellectual property database for data records associated with at least one company based upon an intellectual property search criteria and retrieving the results thereof; combining the results of the financial database searching step and the intellectual property database searching step to determine common results on a company basis; and depicting the combined results.

In accordance with yet another aspect of the present invention, there is provided a system for screening financial investment opportunities, comprising: a computer platform responsive to user input including access to at least a financial database including data records associated with at least one company and an intellectual property database including data records associated with at least one company; programmable search software, operable by said computer platform, for searching the financial database for data records associated with at least one company based upon a financial search criteria and retrieving the results thereof for storage in a first memory, said programmable search function also being employed for searching the intellectual property database for data records associated with at least one company based upon an intellectual property search criteria and retrieving the results thereof for storage in a second memory; search analysis software, operable by said computer platform, for combining the results of the financial database search and the intellectual property database search to determine common results; and a display device for depicting the common results.

In accordance with yet a further aspect of the present invention, there is provided a method for processing a search request having financial search criteria, comprising: receiving results from a financial database having at least one data record corresponding to the financial search criteria; determining that the search request includes intellectual property search criteria; filtering said results for data records corresponding to said intellectual property search criteria; and presenting said filtered results.

In accordance with yet a further aspect of the present invention, there is provided a method for processing a search request having intellectual property search criteria, comprising: receiving results from an intellectual property database having at least one data record corresponding to the intellectual property search criteria; determining that the search request includes financial search criteria; filtering said results for data records corresponding to said financial search criteria; and presenting said filtered results.

The techniques described herein are advantageous because they are both simple to implement and use and because they are inexpensive compared to other approaches employed to obtain financial information about a company in conjunction with intellectual property information such as patents. In addition, the techniques can be used to enable a potential investor to obtain, on-line, information that pertains to financial performance of a company as well as patent information that may provide an indication of the company's protection of its intellectual property assets. The techniques of the invention are advantageous because they provide important information for investors via a single interface or resource.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

The present invention will be described in connection with a preferred embodiment as depicted in the Figures, however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION OF THE INVENTION

The present invention will now be described with reference to the drawings, wherein like reference numerals are used to refer to like elements throughout.

Turning first to the nomenclature of the specification, the detailed description that follows represents processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices.

A process may generally be defined as being a sequence of computer-executed steps leading to a desired result. These steps generally require physical manipulations of physical quantities. It should also be understood that manipulations within the computer are often referred to in terms such as adding, comparing, moving, positioning, placing, illuminating, removing, altering, etc. In addition, it should be understood that the programs, processes, methods, etc. described herein are not related or limited to any particular computer or apparatus nor are they related or limited to any particular communication network architecture. Rather, various types of general-purpose machines may be used with program modules constructed in accordance with the teachings described herein.

The Internet is a vast computer network consisting of many smaller networks that span the entire world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may issue the data and a client computer displays or processes it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Figure 1A:
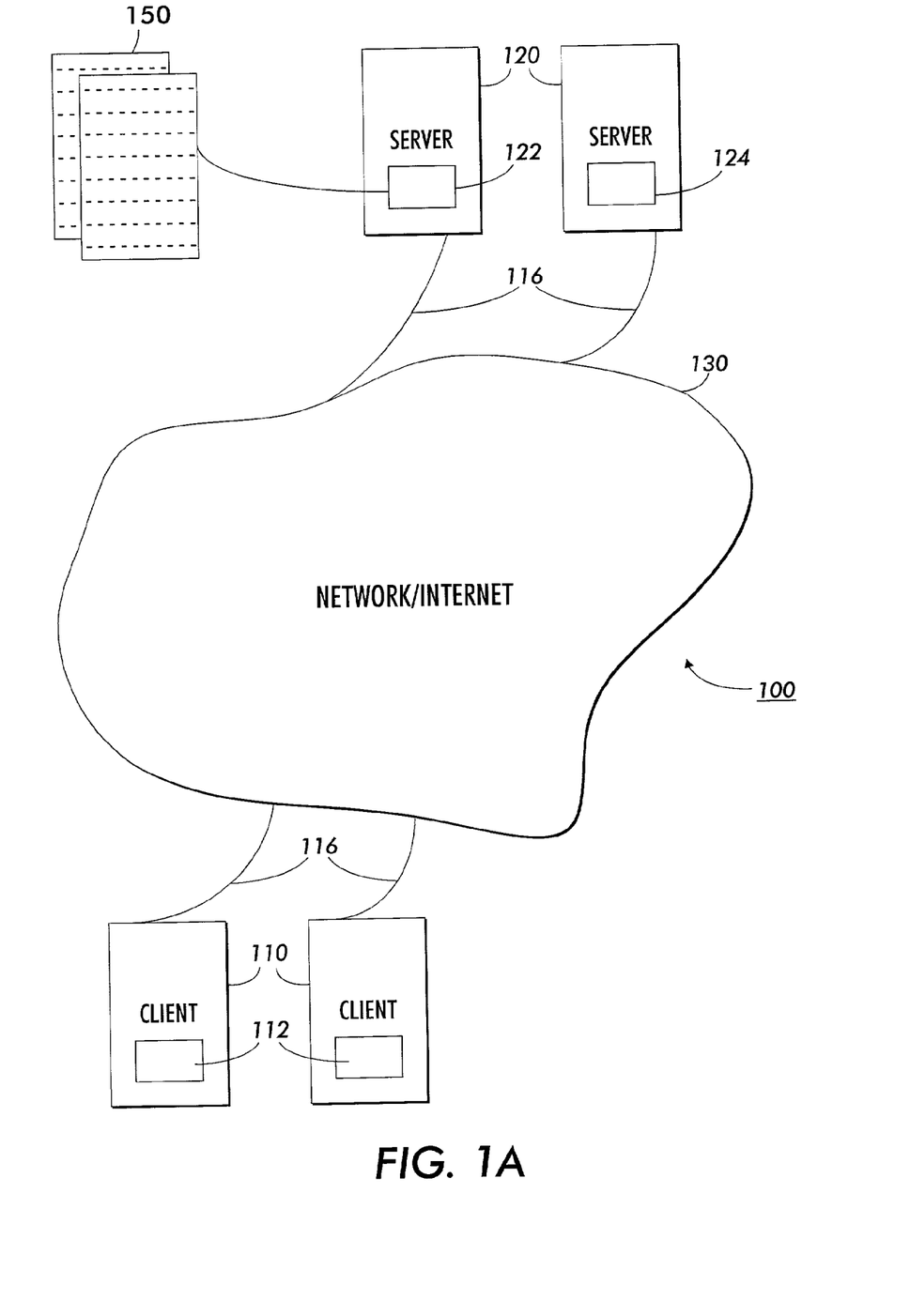
FIG. 1A is a block diagram of an exemplary distributed computer system in accordance with the present invention.

FIG. 1A illustrates an exemplary system for providing a distributed computer system 100 in accordance with one aspect of the present invention and may include client computers or any network access apparatus 110 connected to server computers 120 via a network 130. The distributed system 100 may include client computers or any network access apparatus 110 connected to server computers 120 via a network 130. The network 130 may use Internet communications protocols (IP) to allow clients 110 to communicate with servers 120. The communication device of a network access apparatus 110 may include a transceiver, a modem, a network interface card, or other interface devices to communicate with the electronic network 130. The network access apparatus 110 may be operationally coupled to and/or include a Global Positioning System (GPS) receiver. The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may be accessed via an on-line service, an Internet service provider, a local area network service, a wide area network service, a cable television service, a wireless data service, an intranet, a virtual private network, a peer-to-peer network, a satellite service, or the like.

Client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, a network television, an Internet television, a set top box, a web-enabled telephone, an Internet appliance, a portable wireless device, a television receiver, a game player, a video recorder, and/or an audio component, for example.

Each client 110 typically includes one or more processors, memories, and input/output devices. An input device may be any suitable device for the user to give input to client computer 110; for example: a keyboard, a 10-key pad, a telephone key pad, a light pen or any pen pointing device, a touch-screen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they could be combined; for example: a display with an integrated touch-screen, a display with an integrated keyboard, or a speech-recognition unit combined with a text-to-speech converter.

The servers 120 may be similarly configured. However, in many instances server sites 120 include many computers, perhaps connected by a separate private network. In fact, the network 130 may include hundreds of thousands of individual networks of computers. Although the client computers 110 are shown separate from the server computers 120, it should be understood that a single computer may perform the client and server roles. Those skilled in the art will appreciate that the computer environment 100 shown in FIG. 1A is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional input/output devices. Those skilled in the art will appreciate that the present invention may also be practiced via Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 can be in the form of Web pages 150. The pages 150 can be data records including as content plain textual information, or more complex digitally encoded multimedia content, such as software programs, graphics, audio signals, videos, and so forth. It should be understood that although this description focuses on locating information on the World-Wide-Web, the system can also be used for locating information via other wide or local area networks (WANs and LANs), or information stored in a single computer using other communications protocols.

The clients 110 may execute Web browser programs 112, such as Netscape Navigator or Microsoft Internet Explorer (MSIE) to locate the pages or records 150. The browser programs 112 enable users to enter addresses of specific Web pages 150 to be retrieved. Typically, the address of a Web page is specified as a Uniform Resource Identifier (URI) or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

Figure 1B:
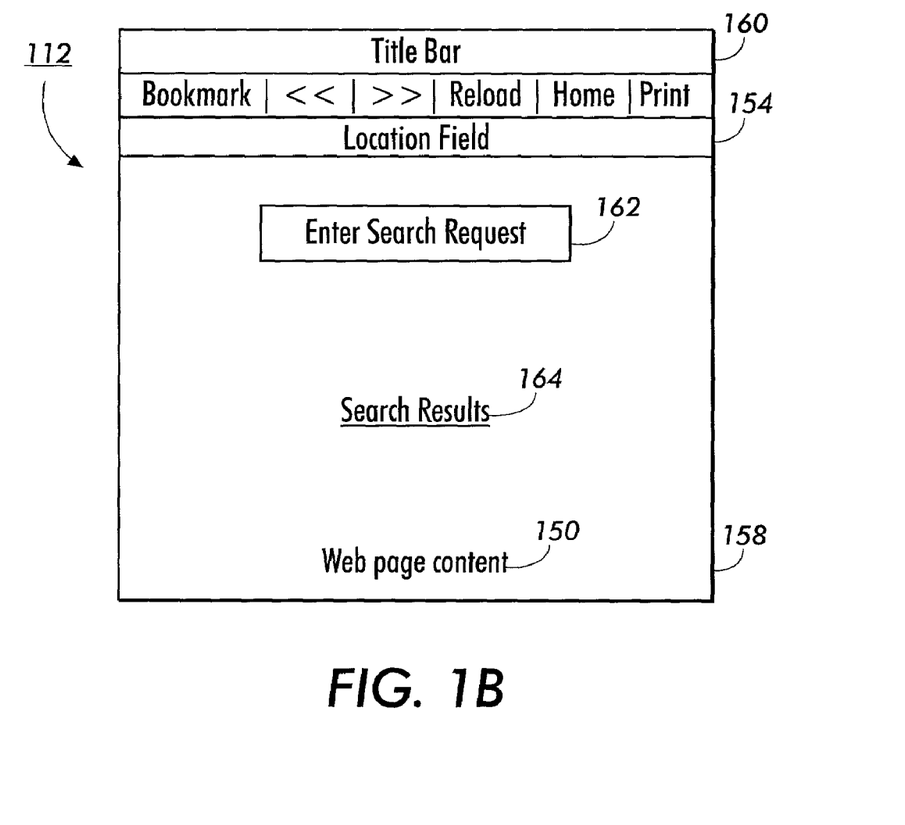
FIG. 1B is a diagram depicting the location field or web page search request used in a conventional web browser.

FIG. 1B more specifically illustrates an exemplary selection of common operative components of a web browser program 112. The web browser 112 enables a user to access a particular web page 150 by typing the URL for the web page 150 in the location field 154. The web page 150 contents corresponding to the URL in the location field 154 may be displayed within the client area of the web browser display window 158, for example. Title information from the web page 150 may be displayed in the title bar 160 of the web browser 112. The web page 150 contents may further include a user interface element such as that of an input text box 162 for inputting search requests and, in turn, search results having identifiers 164 such as a hyperlink or URL.

Figure 1C:
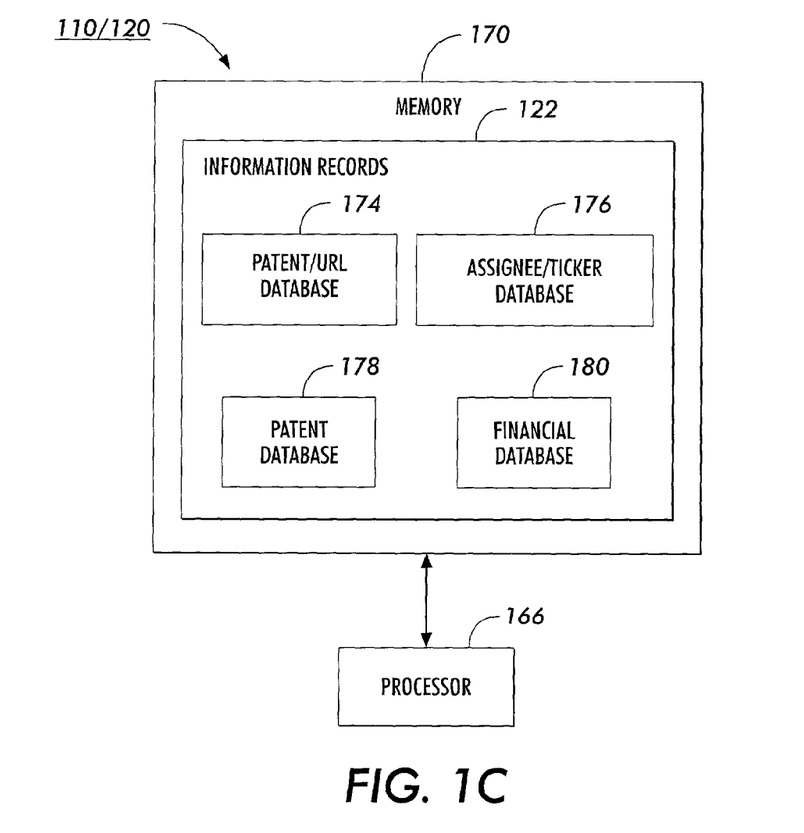
FIG. 1C is a block diagram illustrating exemplary information records stored in memory in accordance with the present invention.

FIG. 1C illustrates a block diagram of a processor 166 coupled to a storage device such as memory 170 in a client 110 or server 120 computing system. Stored in memory are information records 122 having combinations of the following content such as lists, files, and databases. Such records include; a patent/URL database 174 for filtering search results that pertain only to patent related content, a patent database 178 having a company code, a financial database 180 having a ticker symbol, and an assignee/ticker database 176 having both a company code and ticker symbol for creating a database relation between both the patent database 178 and financial database 180. In another configuration, the patent and financial database both have a company code and ticker symbol as fields which may eliminate the need to rely on the assignee/ticker database 176. Both the patent/URL database 174 and the assignee/ticker database 176 may also be called reference databases. Reference information records may be used to access both patent and financial databases. These information records are further introduced and discussed in more detail throughout the disclosure of this invention.

Figure 1D:
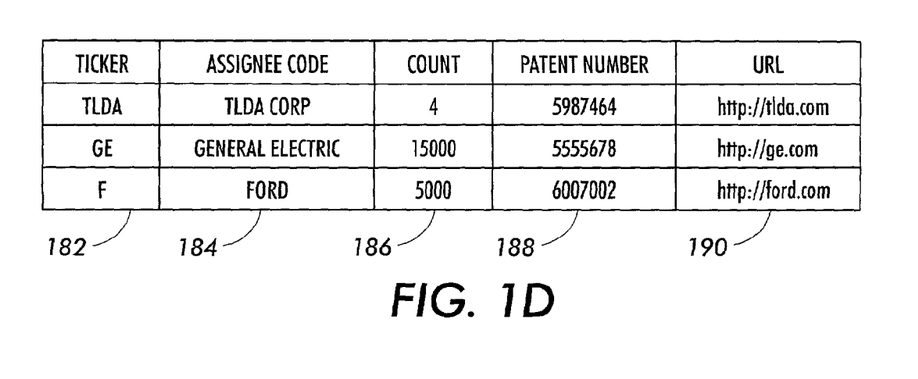
FIG. 1D presents an exemplary table in accordance with the present invention illustrating the data structure of an assignee/ticker database.

FIG. 1D illustrates an exemplary data structure for storing data in the assignee/ticker database 176. Such data includes the ticker symbol of a public company 182, the company code or patent assignee code for the public company 184, the number of patents for the public company 186, the patent numbers/serial numbers of patents that correspond to the public company 188, and URL data 190. Other patent bibliographic data (e.g., date filed, class, date issued, country, etc.) and/or financial data may also be stored as data elements. The ticker symbol or patent assignee code may be used as common data elements to create a database relation or correspondence between the patent database 178 and financial database 180.

Figure 2A:
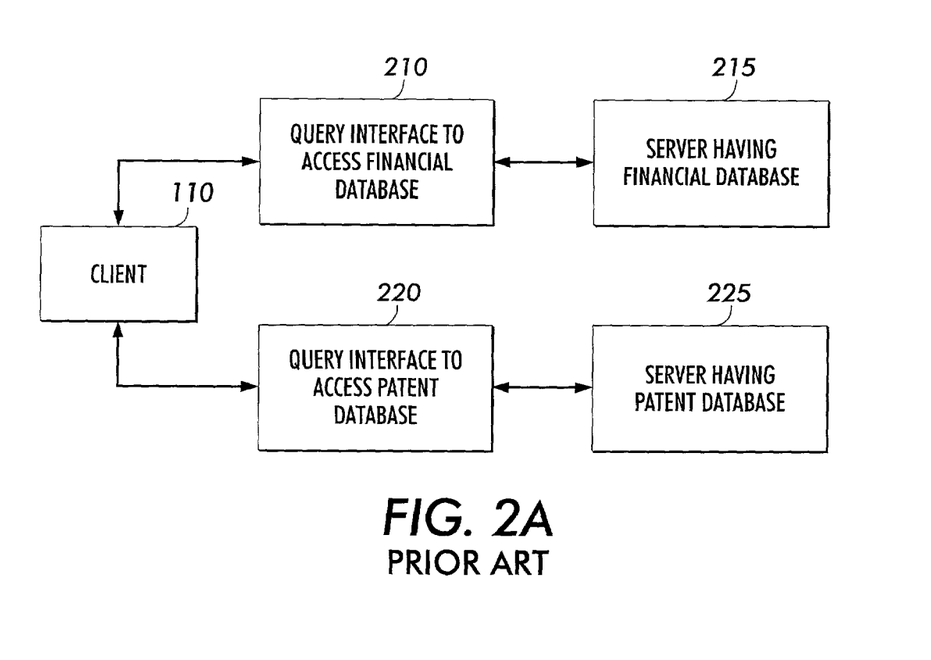
FIG. 2A is a block diagram illustrating an exemplary prior art system for querying a financial database or patent database.

FIG. 2A illustrates an exemplary prior art block diagram of a query system. A client 110 may access a server 215 having a financial database 180 by submitting a search request via a financial query interface 210 and retrieve results from the financial database 180. A client 110 may also access a server 225 having a patent database 178 by submitting a search request via a patent query interface 220 and retrieve results from the patent database 178.

Figure 2B:
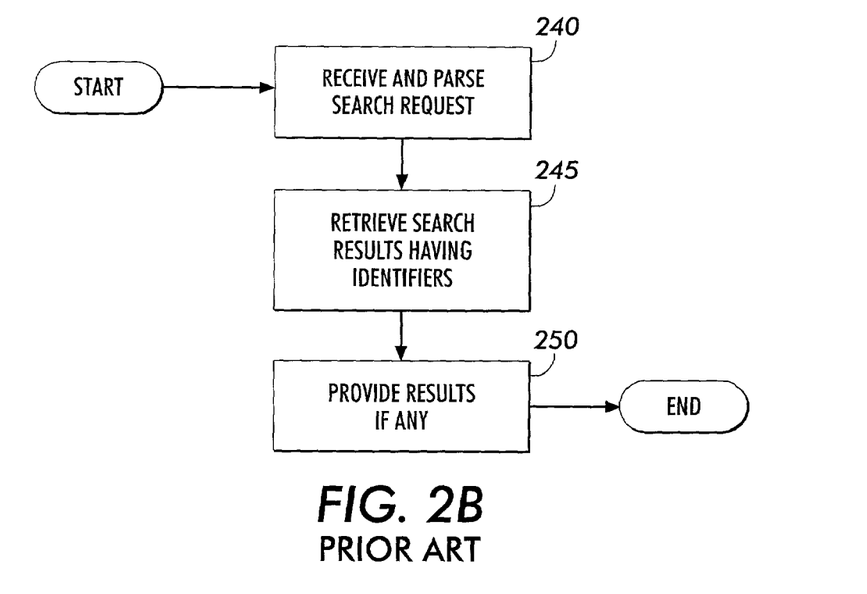
FIG. 2B is a flowchart illustrating the steps performed by a prior art system for displaying search results.

FIG. 2B is a flowchart illustrating the steps of an exemplary prior art system for returning search results. A network access apparatus 110, servlet, applet, stand-alone executable program, command line of a device such as a phone browser, or user interface element such as a text box object or location field 154 of a web browser 112, receives and parses a search request in step 240. The search request is passed to a server system 120 and search results having identifiers are retrieved in step 245. The search request is generally passed as a query to access a database 124 stored on the server system 120 and the retrieved identifiers may represent network resources 164 in the form of URLs or hyperlinks. Such results, if any, are provided in step 250 to the client system 110.

Figure 3A:
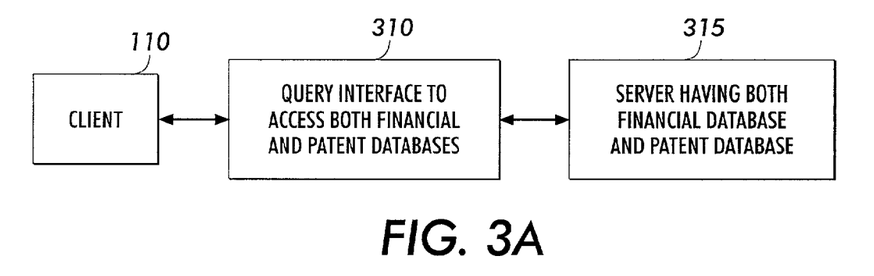
FIG. 3A is a block diagram illustrating an exemplary query system for accessing financial and/or patent information from a single server system in accordance with the present invention.

FIG. 3A illustrates an exemplary block diagram of an improved query system in accordance with the present invention. A client 110 may access a server 315 having both a financial database and patent database by submitting a search request through a single query interface 310 that includes the selection of both financial and patent search criteria. A ticker symbol or company/assignee code may be used as a common data element in both the financial and patent database in order to retrieve results.

Figure 3B:
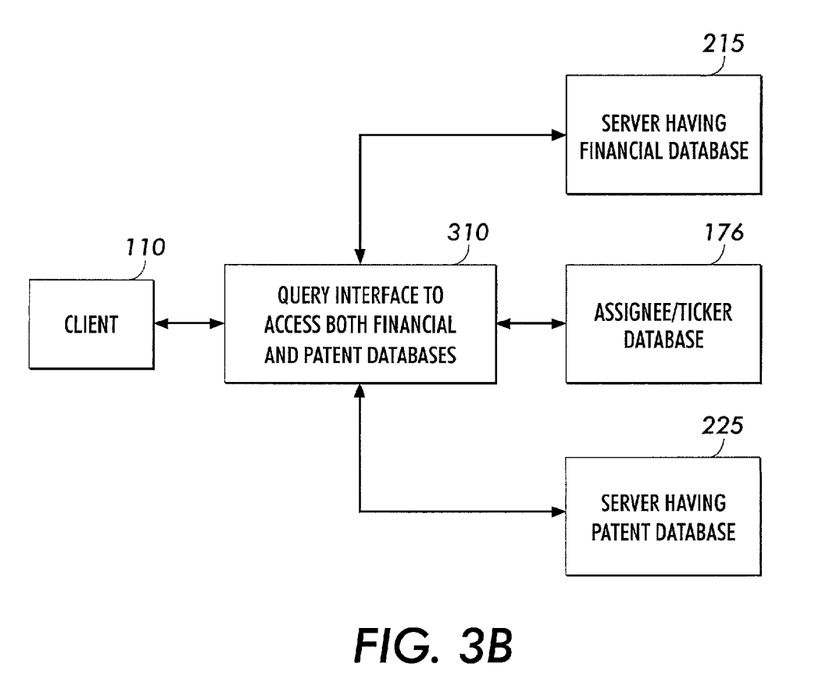
FIG. 3B is a block diagram illustrating an exemplary query system for accessing financial and/or patent information from a plurality of server systems in accordance with the present invention.

FIG. 3B illustrates another aspect of an improved query system in accordance with the present invention. A client 110 may access a server 215 having a financial database and a server 225 having a patent database by submitting a search request through a single query interface 310 that includes the selection of both financial and patent search criteria. A ticker symbol or company/assignee code may be used as a common data element in both the financial and patent database as one method for retrieving results. If there are no common data elements, then the assignee/ticker database 176 can be consulted in response to the query request and used to filter the desired search results from both the financial and patent databases.

One aspect of the present invention contemplates a method for implementing searches of financial and intellectual property databases and combining the search results for companies or organizations having records or other commonality between the databases. However, it is further contemplated that such a searching method may further include the step of constructing a search query having both financial search criteria and intellectual property search criteria, wherein the step of constructing such a search query is facilitated by the step of displaying a search construction interface to a user (e.g., FIG. 4A).

Figure 3C:
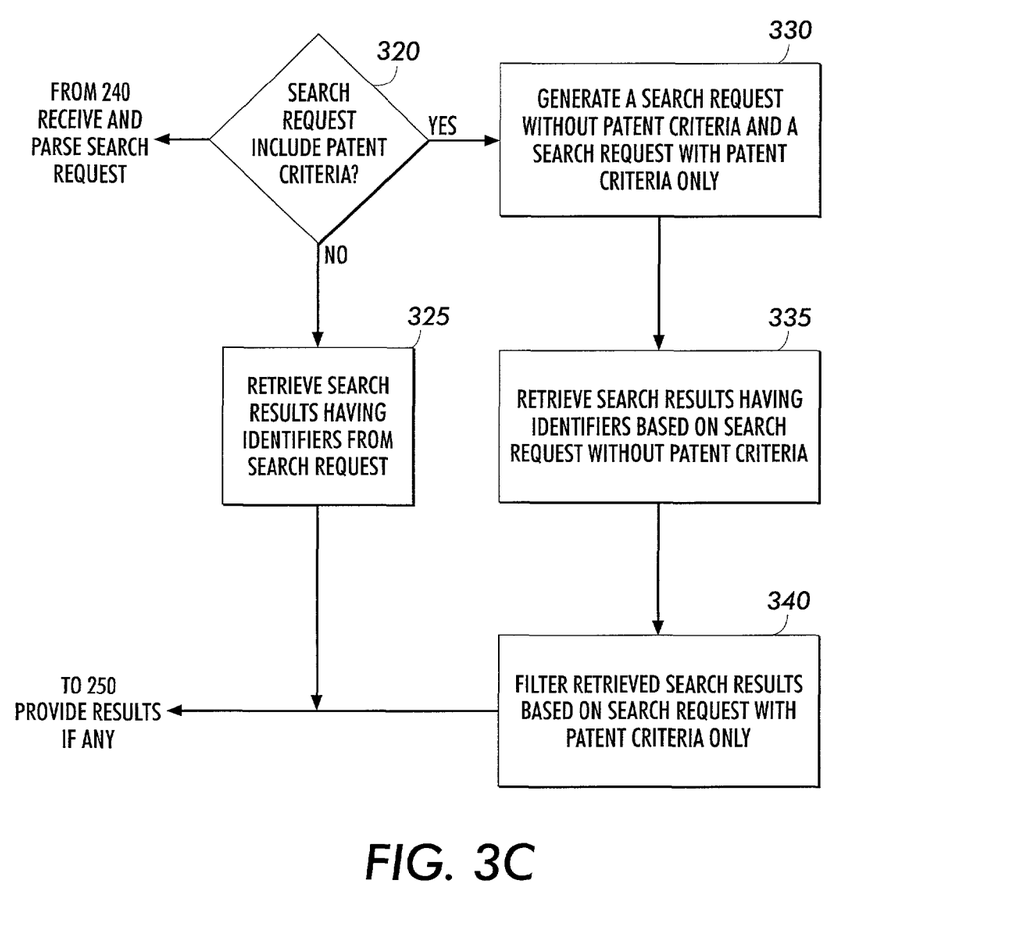
FIG. 3C is a flowchart illustrating the steps performed for returning search results in accordance with the present invention.

FIG. 3C is a top-level flowchart illustrating the steps of an exemplary system for returning search results. A network access apparatus 110, servlet, applet, stand-alone executable program, command line of a device such as a phone browser, or user interface element such as a text box object or location field 154 of a web browser 112, receives and parses a search request in step 240 by using a single query interface 310 that includes the selection of both financial and patent search criteria. The query interface 310 serves as a front end for accessing both a patent database 178 and financial database 180, particularly when such databases are supplied by separate vendors.

It may then be determined in step 320 whether the search request includes any patent criteria. If not, then search results having identifiers are retrieved in step 245. However, when it is determined in step 320 that patent criteria are included in the search request (step 210), a search request without patent criteria and a search request with patent criteria only are generated in step 330. Search results having identifiers based on search request are retrieved in step 335 without patent criteria and retrieved search results are then filtered in step 340 based on the generated search request with patent criteria only. Such results, if any, are provided in step 250 to the client system 110. The assignee/ticker database 176 is consulted as needed to generate results that correspond to both the patent 178 and financial 180 databases. For example, the step of combining the results of the financial database searching step and the intellectual property database searching step, further comprises accessing an assignee/ticker database to determine linkages between the financial database and the intellectual property database on a company basis.

Figure 4A:
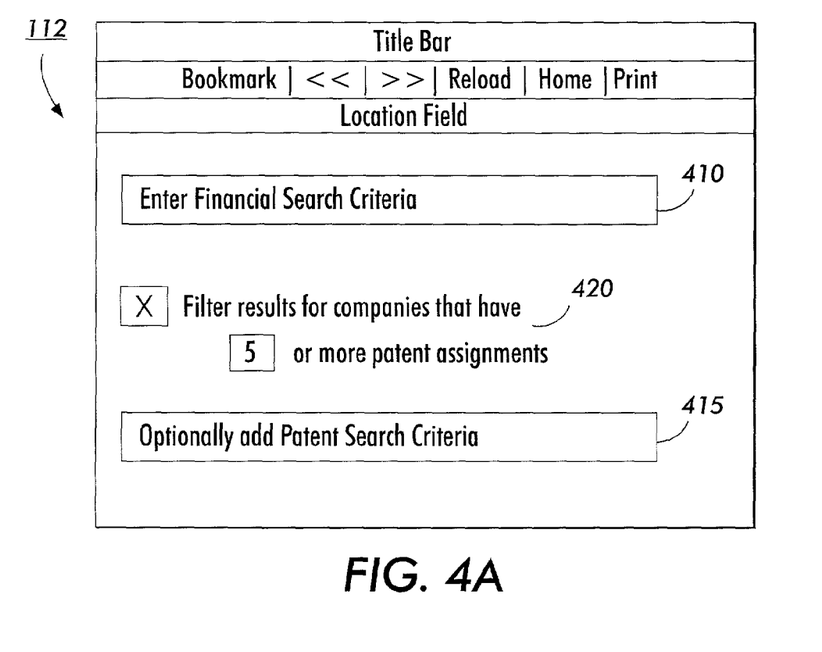
FIG. 4A is a diagram depicting an improved financial query interface for accessing patent and financial information in accordance with the present invention.

FIG. 4A is a diagram depicting an improved financial query interface for accessing patent and financial information in accordance with the present invention. Financial search criteria 410 may be selected from a user interface element. Financial search criteria may include the selection of parameters such as Stock Price, Price/Earnings Ratio, Current Ratio, Debt/Equity Ratio, Cash/Price ratio, Earnings per Share Growth-1 Yr, Earnings per Share Growth-1 Yr, Insider Trades, Institutional Holdings %, Price/Book Ratio, and Price/Cash Flow Ratio. It is also conceivable that one or more of the search criteria specified, particularly those employed in the financial query, may be delimited by maximum and/or minimum values. For example, a stock price trading at between greater than $20 and less than $50.

The search results may be filtered by displaying public companies having patent portfolios only. Patent search criteria 415 may be selected from a user interface element from the same query interface. For instance, results may be filtered by a user selecting a filter for public companies that have five or more patent assignments for display as depicted in region 420.

Figure 4B:
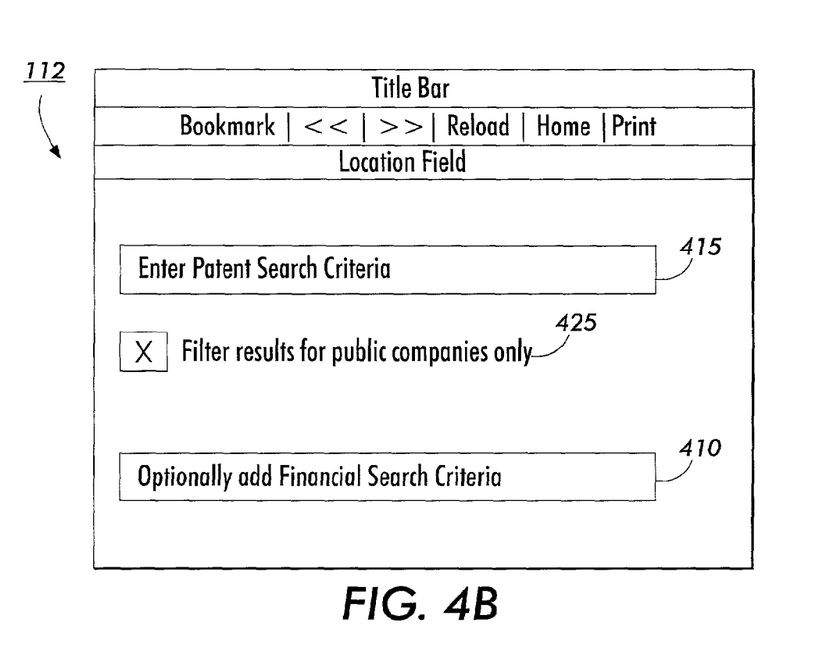
FIG. 4B is a diagram depicting an improved patent query interface for accessing patent and financial information in accordance with the present invention.

FIG. 4B is a diagram depicting an improved patent query interface for accessing patent and financial information in accordance with the present invention. Patent search criteria 415 may be selected from a user interface element. Patent search criteria may include the selection of parameters such as Patent Number, Inventor Name, Issue Date, Title, Inventor State, Abstract, Inventor Country, Claim(s), Attorney or Agent, Description/Specification, Assignee Name, Assignee State, Assignee Country, Issued US Classification, International Classification, Application Serial Number, Application Date, Primary Examiner, Assistant Examiner, Parent Case Information, Related US App. Data, US References, Reissue Data Foreign References, Foreign Priority, PCT Information, Government Interest, Application Type. The search results may be filtered by displaying only public companies. Financial search criteria 410 may be selected from a user interface element from the same query interface. Results may be filtered by selecting 425 public companies only for display.

Figure 5A:
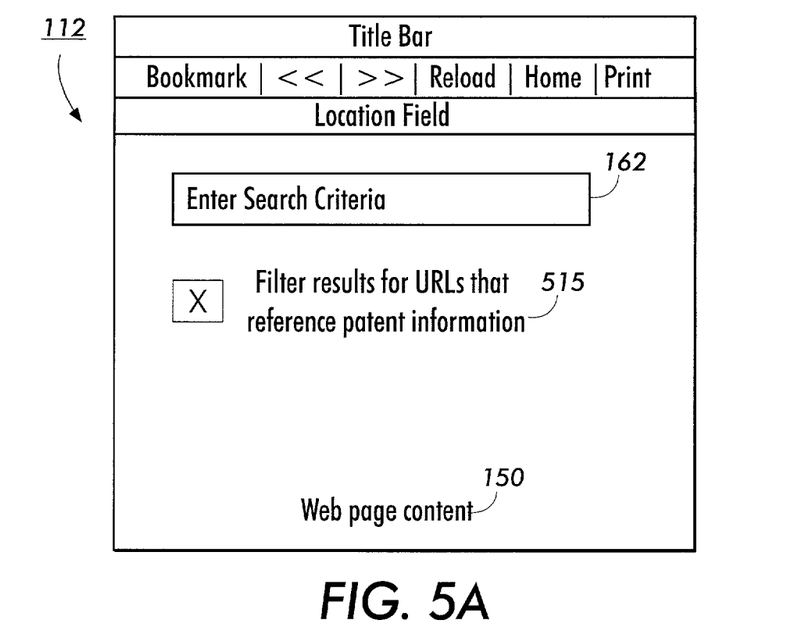
FIG. 5A is a diagram depicting an improved general query interface for accessing patent information in accordance with the present invention.
Figure 5B:
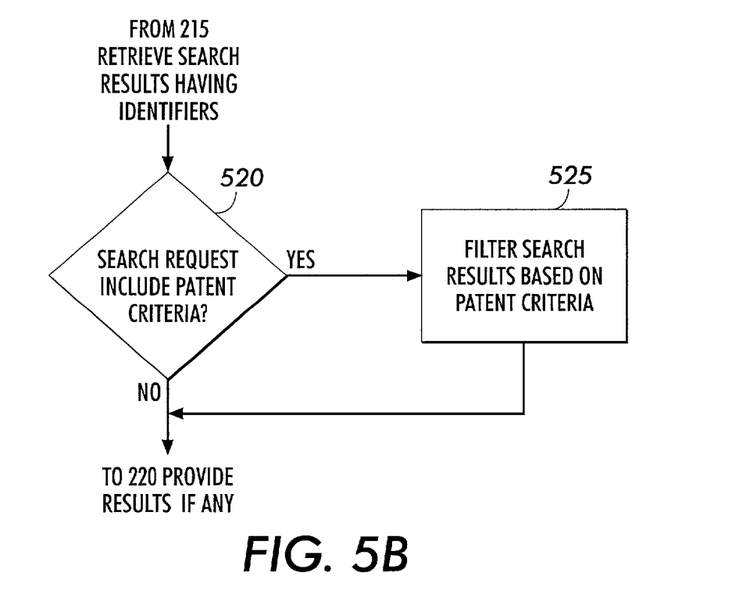
FIG. 5B is a top-level flowchart illustrating the steps of an exemplary system for filtering search results in accordance with the present invention.

FIG. 5A is a diagram depicting an improved query interface for accessing search results in accordance with the present invention. Search criteria 162 may be selected from a user interface element. Search results may be filtered 515 by displaying only identifiers that reference patent information. The patent/URL database may be consulted to determine what results are filtered. FIG. 5B is a top-level flowchart illustrating the steps of an exemplary system for filtering search results. When search results having identifiers are retrieved in step 245, it is determined in step 520 whether the search request includes patent criteria. If not, results if any, are provided in step 250. When patent criteria is requested as part of a search then search results are filtered in step 525 based on the patent criteria and results if any, are provided in step 250.

Figure 6:
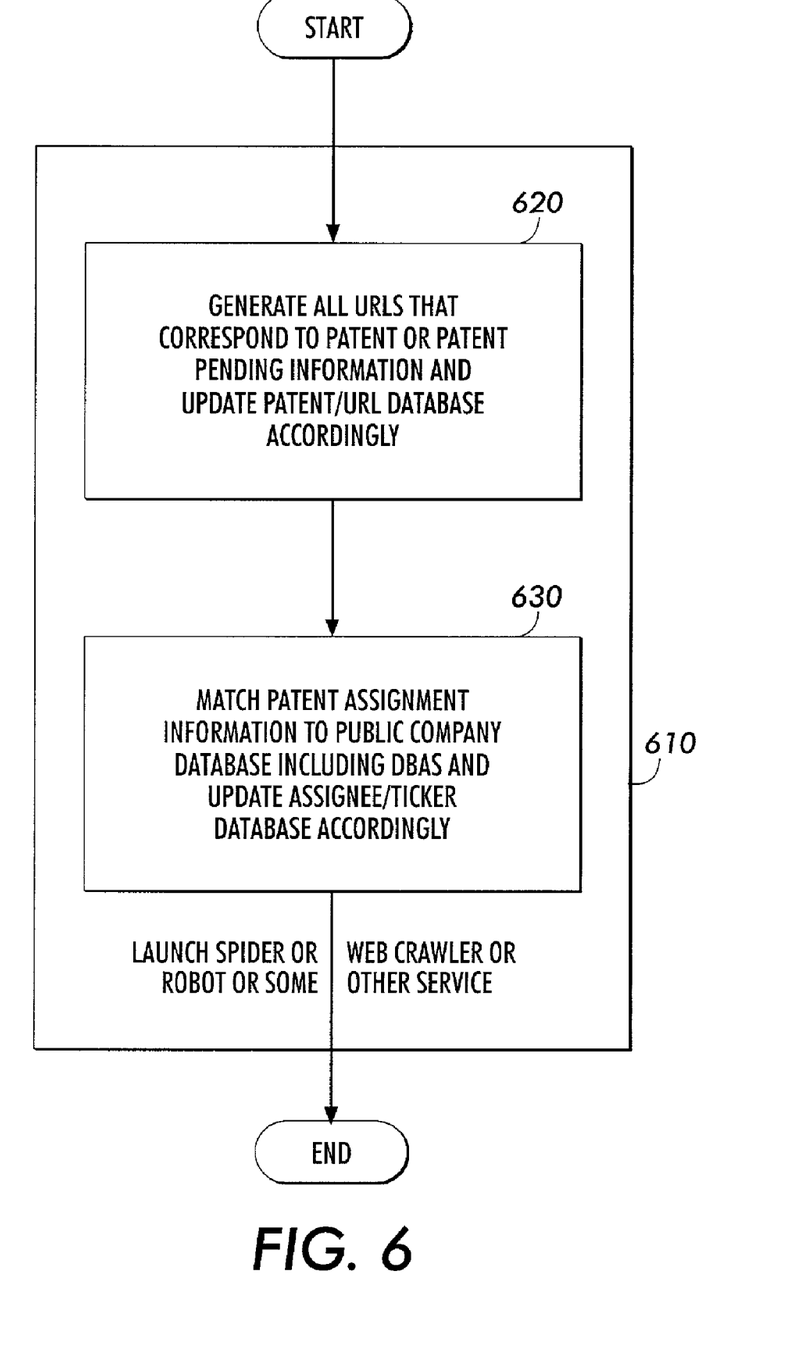
FIG. 6 is a top-level flowchart illustrating the steps of a system for maintaining reference databases in accordance with the present invention.

FIG. 6 is a top-level flowchart illustrating the steps of an exemplary system for maintaining reference databases. A web crawler, spider, robot, or other service is launched in step 610 to discover network resources such as URLs. URLs that correspond to patent or patent pending information in step 620 are stored and updated in the paten/URL database 174. Also patent assignment information is matched in step 635 to a public company database (e.g., SEC, NYSE, NASDAQ, etc.) including doing-business-as (DBA) databases and updates are stored in the Assignee/Ticker database accordingly 176.

More specifically, the methods employed by the present invention may include maintaining the financial database data records and the intellectual property database records, wherein the step includes periodically launching an automated search of network resources to locate and update financial and intellectual property information, and storing the updated information in the respective database. Information that is updated by automated or manual processes within the system may include at least one item of financial data such as Stock Price, Price/Earnings Ratio, Current Ratio, Debt/Equity Ratio, Cash/Price ratio, Earnings per Share Growth-1 Yr, Earnings per Share Growth-1 Yr, Insider Trades, Institutional Holdings %, Price/Book Ratio, and Price/Cash Flow Ratio. Similarly, information that is updated within the system may also include at least one item of intellectual property data such as Patent Number, Inventor Name, Issue Date, Title, Inventor State, Abstract, Inventor Country, Claim(s), Attorney or Agent, Description/Specification, Assignee Name, Assignee State, Assignee Country, Issued US Classification, International Classification, Application Serial Number, Application Date, Primary Examiner, Assistant Examiner, Parent Case Information, Related US App. Data, US References, Reissue Data Foreign References, Foreign Priority, PCT Information, Government Interest, and Application Type.

Figure 7:
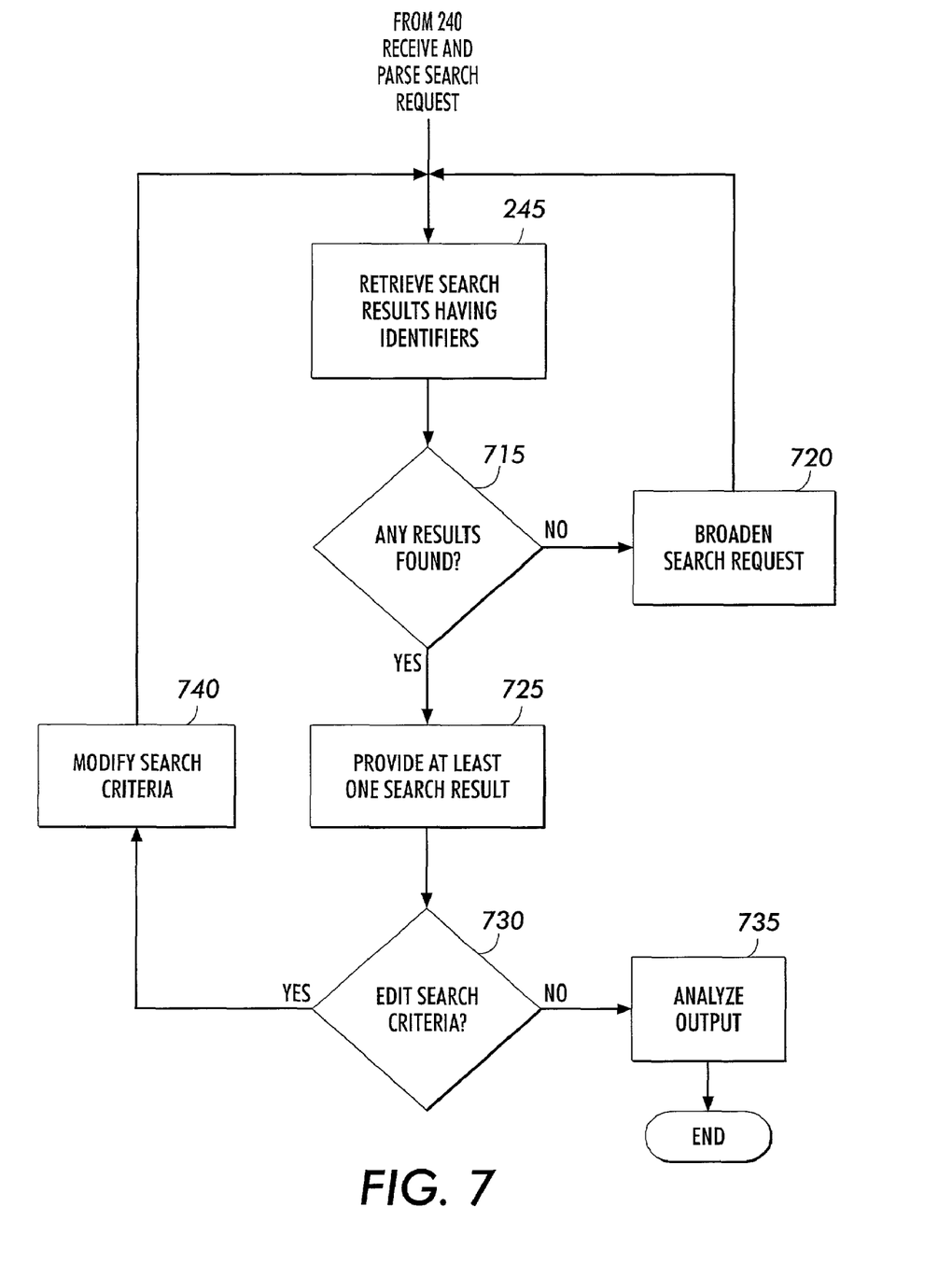
FIG. 7 is a flowchart illustrating the steps of providing at least one search result in response to not finding a search result in accordance with the present invention.

FIG. 7 is a flowchart illustrating the steps of providing at least one search result in response to not finding a search result during a prior search. After the retrieval of search results (step 245) it is determined in step 715 whether any search results were found. If not, the search request is automatically broadened in step 720 and step 245/step 715 are repeated until at least one result is found. Broadening the search request by relaxing the search criteria may include automatic or user-directed modification of the search criteria, for example, eliminating one or more words from an assignee name search, or expanding the fields in which a keyword is required to be found. When this is the case, search results are provided in step 725. The user has the option to further edit the search criteria in step 730 by modifying the search criteria in step 740 or leave the search results, as is, and analyze in step 735 the output of the results.

Figure 8A:
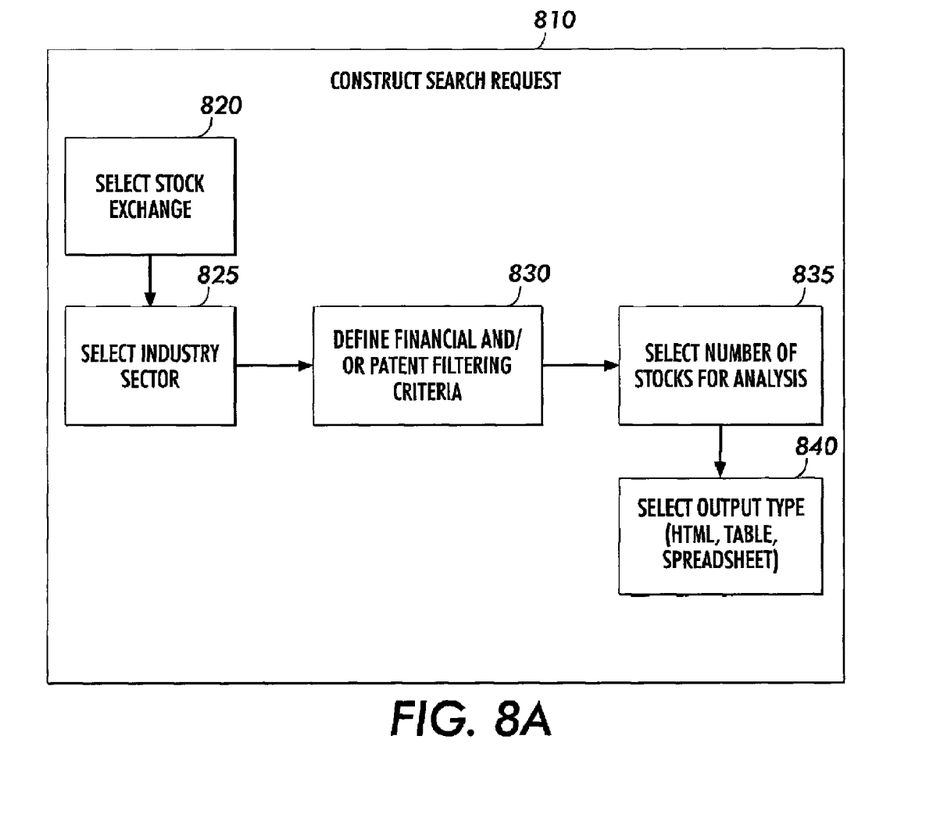
FIG. 8A is a flowchart illustrating the steps for constructing a search request in accordance with the present invention.

More specifically, the method employed by an aspect of the present invention may further comprise the step of analyzing the number of common results on a company basis to determine if the number is greater than zero. If not, the method may relax the search criteria employed in the searching step and rerun the search(es) so as to obtain a non-zero number of common results. It is also contemplated that the step of relaxing the search criteria may be accomplished without user intervention. FIG. 8A is a flowchart illustrating steps for constructing a search request. A single query interface 310 that includes the selection of both financial and patent search criteria is used to construct 810 a search request. For instance, a stock exchange may be selected 820, an industry sector may be selected 825, financial and/or patent filtering criteria may be defined and selected 830 (such criteria is listed in the description of FIGS. 4A and 4B), the number of stocks for analysis may be selected 835, and the output type (HTML, table, spreadsheet) may be selected 840.

Figure 8B:
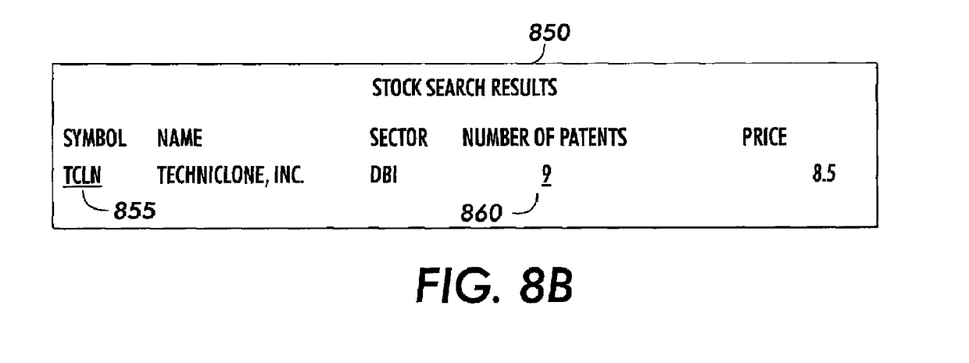
FIG. 8B is a diagram depicting the results of a search request in accordance with the present invention.

FIG. 8B is a diagram depicting the results of a search request. When a financial search request is processed and stock search results are provided 850, the stock symbol is hyperlinked 855 as a means to access more company information. In addition, the number of patents that are assigned to the public company is also hyperlinked 860 as a means to access patent portfolio information of the public company.

The features of the present invention may, in one embodiment be employed to display, for a user, financial or stock information in association with intellectual property information. While a patent portfolio has been described as a key intellectual property element, the present invention is further extensible to include trademark registrations (state and/or federal), copyright registrations, etc. In such a system, the intellectual property information is preferably depicted in conjunction with the stock or financial information via a web browser interface as previously described.

Particular examples of such an embodiment include an interface wherein a user might search for and request the display of all biotechnology companies with stocks currently listing for under twenty dollars ($20). Moreover, the interface may further allow the user to request that the search results be prioritized and displayed in one of a number of alternative formats, including:

(a) by order of the number of patents;
(b) by the most U.S. and European patents;
(c) by the most patents of a specified country (e.g. U.S.);
(d) by the most recent patents; or
(e) by the most patents currently in force (i.e., not expired, not disclaimed and not abandoned due to failure to pay maintenance fees).

Similarly, the display may depict any trends of patent filings or issuances (e.g., most patents issued last year, or patents issued per year increasing year over year). Another example is the use of patent and financial information such as profits as a sort selector.

Yet another example includes a search query requesting the identification and display of companies having a stock price below two dollars ($2) with the most patents in any technical arena, and then sorting the results first by market (e.g., biotech, plastics, computers, Internet or similar SIC or other classification category) and then by the most issued patents currently in force.

The present invention further contemplates the use of the afore-described system and search results in conjunction with various presentation and graphing software to aid in the visualization of the information returned in such queries.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. In an on-line financial screening service, a method of using a computer for searching a financial database stored in computer memory, including data for a plurality of companies, and an intellectual property database stored in computer memory, including data for a plurality of companies, in order to find securities matching user search criteria and relevant intellectual property, wherein the users access the databases over the Internet, the method comprising:

constructing, using an interface associated with the computer, a search query having both financial search criteria and intellectual property search criteria defined by a user;

using the computer and interface, searching the database for records matching the financial search criteria and the intellectual property search criteria; and the computer relaxing at least some of the search criteria, until at least a required number of matching records are found, wherein the required number of matching records is never less than one; and the computer reporting the matching records to the user via the interface, including at least one item of data selected from the group consisting of Stock Price, Price/Earnings Ratio, Current Ratio, Debt/Equity Ratio, Cash/Price ratio, Earnings per Share Growth-1 Yr, Earnings per Share Growth-1 Yr, Insider Trades, Institutional Holdings %, Price/Book Ratio, and Price/Cash Flow Ratio.

2. The method of claim 1, wherein the search criteria is suitable for being delimited between a minimum and maximum.

3. In an on-line service, a method operating on a computer for screening financial investment opportunities, comprising:

constructing on a query interface associated with the computer constructing a search query having both financial search criteria and intellectual property search criteria;

the computer searching a financial database, including data for a plurality of companies stored in computer memory, for data records associated with at least one company based upon the financial search criteria and retrieving the results thereof;

the computer searching an intellectual property database, including data for a plurality of companies stored in computer memory, for data records associated with the at least one company based upon the intellectual property search criteria and retrieving the results thereof;

the computer combining the results of the financial database searching step and the intellectual property database searching step to determine common results on a company basis;

the computer analyzing the number of common results on a company basis to determine if the number is greater than zero, and if not relaxing the search criteria employed in at least one of the searching steps and rerunning the searches to obtain a non-zero number of common results; and the computer depicting the combined results via an interface.

4. In an on-line service accessed by a computer, a method for screening financial investment opportunities, comprising:

the computer, including a query interface, constructing a search query via the query interface having both financial search criteria and intellectual property search criteria;

the computer searching a financial database, including data for a plurality of companies, for data records associated with at least one company based upon the financial search criteria and retrieving the results thereof;

the computer searching an intellectual property database, including data for a plurality of companies, for data records associated with the at least one company based upon the intellectual property search criteria and retrieving the results thereof;

the computer combining the results of the financial database searching step and the intellectual property database searching step to determine common results on a company basis;

the computer analyzing the number of common results on a company basis to determine if the number is greater than zero, and if not relaxing the search criteria employed in at least one of the searching steps and rerunning the searches to obtain a non-zero number of common results; and the computer depicting the common results.

5. The method of claim 4, wherein the step of relaxing the search criteria is accomplished without user intervention.

6. The method of claim 4, further including the step of maintaining the financial database data records and the intellectual property database records, wherein the step includes periodically launching an automated search of network resources to locate and update financial and intellectual property information; and storing the updated information in the respective database.

7. The method of claim 6, wherein the updated information includes:

at least one item of financial data selected from the group consisting of Stock Price, Price/Earnings Ratio, Current Ratio, Debt/Equity Ratio, Cash/Price ratio, Earnings per Share Growth-1 Yr, Earnings per Share Growth-1 Yr, Insider Trades, Institutional Holdings %, Price/Book Ratio, and Price/Cash Flow Ratio, and at least one item of intellectual property data selected from the group consisting of Patent Number, Inventor Name, Issue Date, Title, Inventor State, Abstract, Inventor Country, claim(s), Attorney or Agent, Description/Specification, Assignee Name, Assignee State, Assignee Country, Issued US Classification, International Classification, Application Serial Number, Application Date, Primary Examiner, Assistant Examiner, Parent Case Information, Related US App. Data, US References, Reissue Data Foreign References, Foreign Priority, PCT Information, Government Interest, and Application Type.

8. The method of claim 4, wherein the step of constructing a search query having both financial search criteria and intellectual property search criteria is facilitated by the step of displaying a search construction interface to a user.

9. A system for screening financial investment opportunities, comprising:

a computer platform responsive to user input and providing access to at least a financial database including data records associated with a plurality of companies and an intellectual property database including data records associated with a plurality of companies;

a query interface, associated with said computer platform, said query interface configured to construct a search query including both financial search criteria and intellectual property search criteria;

programmable search software, operable by said computer platform, to search the financial database for data records associated with at least one company based upon the financial search criteria and retrieve the results thereof for storage in a first memory, and to search the intellectual property database for data records associated with the at least one company based upon the intellectual property search criteria and retrieve the results thereof for storage in a second memory;

the computer platform configured to automatically relax search criteria employed by the programmable search software to obtain a non-zero number of search results;

search analysis software, operable by said computer platform, to combine the results of the financial database search and the intellectual property database search to determine common results; and a display device for depicting the common results.

10. The system of claim 9, wherein said computer platform includes a client and a server interconnected by a network, and where the financial database and the intellectual property database are stored on devices accessible through said server.

11. The system of claim 9, wherein said financial database includes records having at least one item of financial data selected from the group consisting of Stock Price, Price/Earnings Ratio, Current Ratio, Debt/Equity Ratio, Cash/Price ratio, Earnings per Share Growth-1 Yr, Earnings per Share Growth-1 Yr, Insider Trades, Institutional Holdings %, Price/Book Ratio, and Price/Cash Flow Ratio, and where said intellectual property database includes records having at least one item of intellectual property data selected from the group consisting of Patent Number, Inventor Name, Issue Date, Title, Inventor State, Abstract, Inventor Country, claim(s), Attorney or Agent, Description/Specification, Assignee Name, Assignee State, Assignee Country, Issued US Classification, International Classification, Application Serial Number, Application Date, Primary Examiner, Assistant Examiner, Parent Case Information, Related US App. Data, US References, Reissue Data Foreign References, Foreign Priority, PCT Information, Government Interest, and Application Type.

12. The system of claim 9, wherein said display device is suitable for the display of at least one user-selectable data item to assist with the construction of a search query having both financial search criteria and intellectual property search criteria.

* * * * *